Patented July 4, 1944                            2,352,680

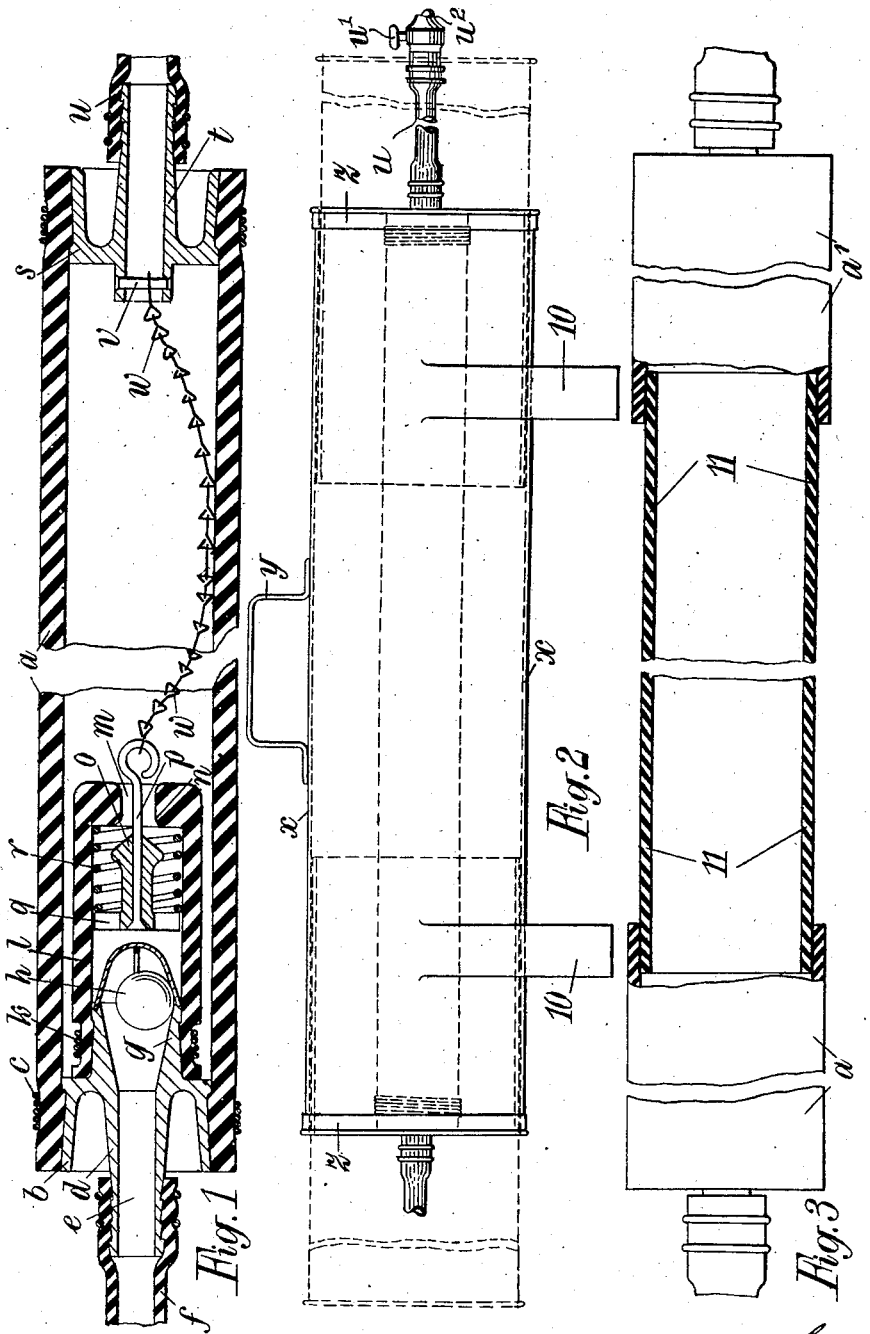

UNITED STATES PATENT OFFICE 2,352,680

SUPPLY AND DELIVERY OF LIQUID UNDER PRESSURE

Lindley Robertson Armitage, Enfield, England

Application February 6, 1941, Serial No. 377,738
In Great Britain April 26, 1940

3 Claims. (Cl. 299—90)

The invention relates to the supply and delivery of liquid under pressure, such as water and intended more particularly for the extinction of a fire although in some cases it may be used for gardening or other purposes and relates to that type of device comprising an expanding member or storage vessel which holds its charge under the pressure of an expanded elastic wall which exerts the force necessary to discharge the liquid contents therein under the control of a suitable outlet valve.

The invention is characterised in that the expanding member or vessel is formed of rubber and is adapted to expand for both its diameter and length.

The invention will now be described with reference to the accompanying drawing, in which—

Figure 1 is a longitudinal section of one form of device for carrying the invention into effect.

Figure 2 is a side elevation of a holder or container for the device shown in Figure 1, and Figure 3 is a side elevation partly in section of a modification.

In carrying the invention into effect according to one embodiment and referring to Figure 1, the liquid holder comprises a tube or vessel $a$ constituted by a section of hose pipe formed of resilient rubber instead of the present usual reinforced non-expanding kind.

The inlet end of the tube $a$ is fitted with a closure cap $b$ held within the tube by external wiring indicated at $c$. The cap $b$ carries a hollow centre body $d$ having a nozzle $e$ at its outer end to receive the fluid in any suitable way as from the hose pipe $f$ shown which may be attached to a supply or domestic main, or to a suitable form of pump, such as a stirrup pump. The other end of the body $d$ carries a nozzle $g$ which is internally coned to serve as a seating for a ball valve $h$ to prevent back flow. Secured outside the nozzle $g$ by means of wiring $k$ is one end of a hollow cylindrical body $l$, formed of any suitable material and preferably of hard vulcanised rubber, and other end of the hollow cylindrical body is provided with a central opening $m$. Such opening is flared at each end and the inner end forms a seating $n$ for a valve $o$ carried by a central pin and hook $p$ extending through the opening $m$ into the chamber within the tube $a$. The back end of the valve $o$ is guided by a spider frame $q$ which fits the internal bore in the body $l$, and is adapted to slide longitudinally therein against the force of a spring $r$.

The opposite end of the tube $a$ is also fitted with a closure cap $s$ having a tubular centre body $t$, to the outer end of which may be secured an outlet hose pipe $u$, and on the end of which, shown in Figure 2 there is secured a controlling tap $u^1$ and a nozzle $u^2$ to give a jet of suitable size, or it may be fitted with a spray head. The inner end of the central body $t$ carries a cross pin $v$ to which one end of a light chain or cable $w$ is secured, the other end of which is connected to the hook $p$. The chain $w$ is of such a length as to afford a definite amount of longitudinal extension of the vessel $a$ before closing the valve $o$.

When the vessel $a$ is to be filled with liquid, the outlet tap $u^1$ is closed, and water or liquid under pressure is admitted through the nozzle $e$, passes through the non-return valve $h$ and flows around the open valve $o$ and fills the chamber within the tube $a$. This admission of liquid under pressure is sufficient to distend or expand the rubber tube $a$ both circumferentially and longitudinally and this continues until the chain or cable $w$ is tautened whereupon the inlet valve $o$ is closed. The vessel is now charged with liquid under a static pressure which is substantially equal to, or possibly slightly less than, that of the inlet pressure, due to the resistance to expansion offered by the material forming the vessel $a$, so that when the outlet $u^1$ is opened, the water will be immediately projected with force.

The vessel $a$ may be fitted externally with a suitable loose cover of canvas to limit its expansion, or the whole device as shown in Figure 2 may be contained within a metal or other sleeve $x$ provided with a carrying handle $y$ with telescopic end cover plates $z$ slidably mounted in the ends of the sleeve $x$. In Fig. 2 the vessel $a$ is shown in dotted lines in its contracted condition, the inlet pipe $f$ at one end and the discharge pipe $u$ and tap $u'$ at the other end being the only parts that are seen. The sleeve is conveniently fitted with supporting feet 10 as shown, and it will be understood that the diameter of the sleeve $x$ is such that the vessel $a$ will be allowed to expand circumferentially until it is stopped by the sleeve wall; the vessel at the same time expands longitudinally against the telescopic cover plates $z$.

In a modification the vessel $a$ may be made in one or more sections, and in the latter case the sections may be of different expansion values. Such an arrangement is diagrammatically shown in Figure 3 where 11 represents a central expansion sleeve rigidly cemented within the centre part of the tube which in this case will comprise two end members $a$ and $a'$. The central section will have a greater expansion capacity than the end portions $a$ and $a'$.

From the foregoing description it will be understood that a convenient and handy appliance is obtained that forms a convenient storage device for water, is readily portable and which may be charged in readiness for use and which may be quickly re-charged. It may be manipulated entirely by one person and carried by hand or trolley to the place where the water or liquid is required. It will also be understood that by adjusting the length of the chain or cable $w$ the amount of liquid admitted will be varied.

I claim:

1. Apparatus for storing and projecting a liquid comprising in combination a longitudinal elastic rubber vessel of stout construction, an inlet opening at one end for attachment to a water service main, the entry of water causing the vessel to be expanded in diameter and also longitudinally to give large capacity, a non-return valve adjacent the inlet opening, a controllable outlet nozzle at the other end of the vessel to permit the automatic projection of the fluid for a relatively long period under constant pressure, and an external longitudinal rigid sleeve surrounding the vessel and normally spaced apart therefrom for a distance which will allow a great distension of the vessel up to a determined limit.

2. Apparatus for storing and projecting a liquid comprising in combination a longitudinal resilient vessel having an opening therein for receiving a supply of liquid under pressure, a valve arranged adjacent said opening, a normally closed outlet for the liquid in said vessel, flexible means connecting said valve to an opposite portion of the vessel for moving the valve to a position to close said opening when the vessel has expanded to a predetermined extent, and a second valve preventing escape of liquid from the vessel through the said opening whereby the liquid in the vessel will be automatically forced therefrom by contraction of the resilient vessel when the outlet is opened to allow the liquid to escape.

3. Apparatus according to claim 2, in which the vessel is formed in sections having different degrees of resiliency and in which the vessel is fitted within a casing for limiting the expansion of the vessel in one direction, the casing including telescopic ends to accommodate longitudinal extension of the vessel.

LINDLEY ROBERTSON ARMITAGE.